United States Patent
McDonald et al.

(10) Patent No.: US 7,130,590 B2
(45) Date of Patent: Oct. 31, 2006

(54) TRANSCEIVER ASSEMBLY

(75) Inventors: Patric W. McDonald, Granite Bay, CA (US); Daniel Bryson, Citrus Heights, CA (US); Patrick Green, Granite Bay, CA (US)

(73) Assignee: Remec Broadband Wireless Holdings, Inc., Poway, CA (US)

( * ) Notice: Subject to any disclaimer, the term of this patent is extended or adjusted under 35 U.S.C. 154(b) by 557 days.

(21) Appl. No.: 10/237,544

(22) Filed: Sep. 6, 2002

(65) Prior Publication Data

US 2003/0068985 A1   Apr. 10, 2003

Related U.S. Application Data

(60) Provisional application No. 60/318,150, filed on Sep. 7, 2001.

(51) Int. Cl.
*H04B 1/46* (2006.01)
(52) U.S. Cl. .................................. 455/80; 333/133
(58) Field of Classification Search .................. 455/73, 455/77, 80, 81, 82, 70; 333/133, 134, 202, 333/204
See application file for complete search history.

(56) References Cited

U.S. PATENT DOCUMENTS

| 4,473,828 | A |   | 9/1984  | Möorz et al. ............... 343/786 |
|-----------|---|---|---------|-------------------------------------|
| 4,901,369 | A |   | 2/1990  | Momose et al. .............. 455/84  |
| 5,129,099 | A |   | 7/1992  | Roberts ....................... 455/81 |
| 5,528,204 | A | * | 6/1996  | Hoang et al. ............... 333/134 |
| 5,905,416 | A |   | 5/1999  | Schmid et al. .............. 333/134 |
| 5,929,721 | A |   | 7/1999  | Munn et al. ................. 333/134 |
| 5,987,060 | A |   | 11/1999 | Grenon et al. .............. 375/213 |
| 6,041,219 | A |   | 3/2000  | Peterson ...................... 455/81 |
| 6,064,862 | A |   | 5/2000  | Grenon et al. ................ 455/73 |
| 6,178,312 | B1|   | 1/2001  | Nelson ....................... 455/109 |

\* cited by examiner

*Primary Examiner*—Lee Nguyen
(74) *Attorney, Agent, or Firm*—Townsend and Townsend andCrew

(57) ABSTRACT

A transceiver assembly including an antenna input/output transition, a transmit module, a receive module, and a diplexer. The diplexer has opposing planar surfaces and the transmit module, receive module and antenna input/output transition are placed on the same planar surface of the diplexer.

2 Claims, 17 Drawing Sheets

US 7,130,590 B2

TRANSCEIVER ASSEMBLY

REFERENCE TO PRIORITY DOCUMENT

This application claims priority of co-pending U.S. Provisional Patent Application Ser. No. 60/318,150 entitled "Transceiver Assembly" by Patric McDonald and Daniel Bryson, filed Sep. 7, 2001. Priority of the filing date of Sep. 7, 2001 is hereby claimed, and the disclosure of the Provisional Patent Application is hereby incorporated by reference.

BACKGROUND OF THE INVENTION

1. Field of the Invention

The invention relates generally to electronic equipment housings. In particular, the invention relates to a radio transceiver housing.

2. Description of the Related Art

Esthetics, component commonality, and frequency flexibility are increasingly important features of communication equipment. Radio equipment operating in the microwave and millimeter wave bands usually include a significant amount of electronic components, such as antennas, in variety of equipment housings, some of which are located out of doors. Because the equipment housings may be located where they are visible, for example outside in view of homeowners and office areas, the size and style of the housings or enclosures for the electronics and antenna needs to be considered during the design of the equipment housings. Additionally, the diversity of frequency band(s), make it desirable that component commonality be maintained, thereby reducing time to market and provide volumetric component costs regardless of whom is the intended customer. In general, smaller housing will result in improved esthetics of the equipment but reductions in housing size can have adverse effects on system performance. For example, reduction in the size of an antenna is limited in part due to a decrease in antenna gain resulting from a smaller antenna. Adverse effects on system performance resulting from decreased antenna gain places practical limits on the reduction of the antenna size.

Thus, there is a need for improving the esthetics of equipment housings, and maintaining component commonality without adversely affecting system performance.

SUMMARY

In accordance with the invention, a transceiver assembly includes an antenna input/output transition, a transmit module, a receive module, and a diplexer. The diplexer has opposing planar surfaces and the transmit module, receive module and antenna input/output transition are placed on the same planar surface of the diplexer.

In one aspect of the transceiver assembly, the diplexer can be removed from the assembly without removing the transmit module and the receive module from the transceiver assembly.

In another aspect, a single PCB is used in the transceiver assembly. The PCB may also include interchangeable personality parts to change various operating features of the assembly.

Other features and advantages of the present invention should be apparent from the following description of the preferred embodiment, which illustrates, by way of example, principles of the invention.

DETAILED DESCRIPTION

Figure 1:
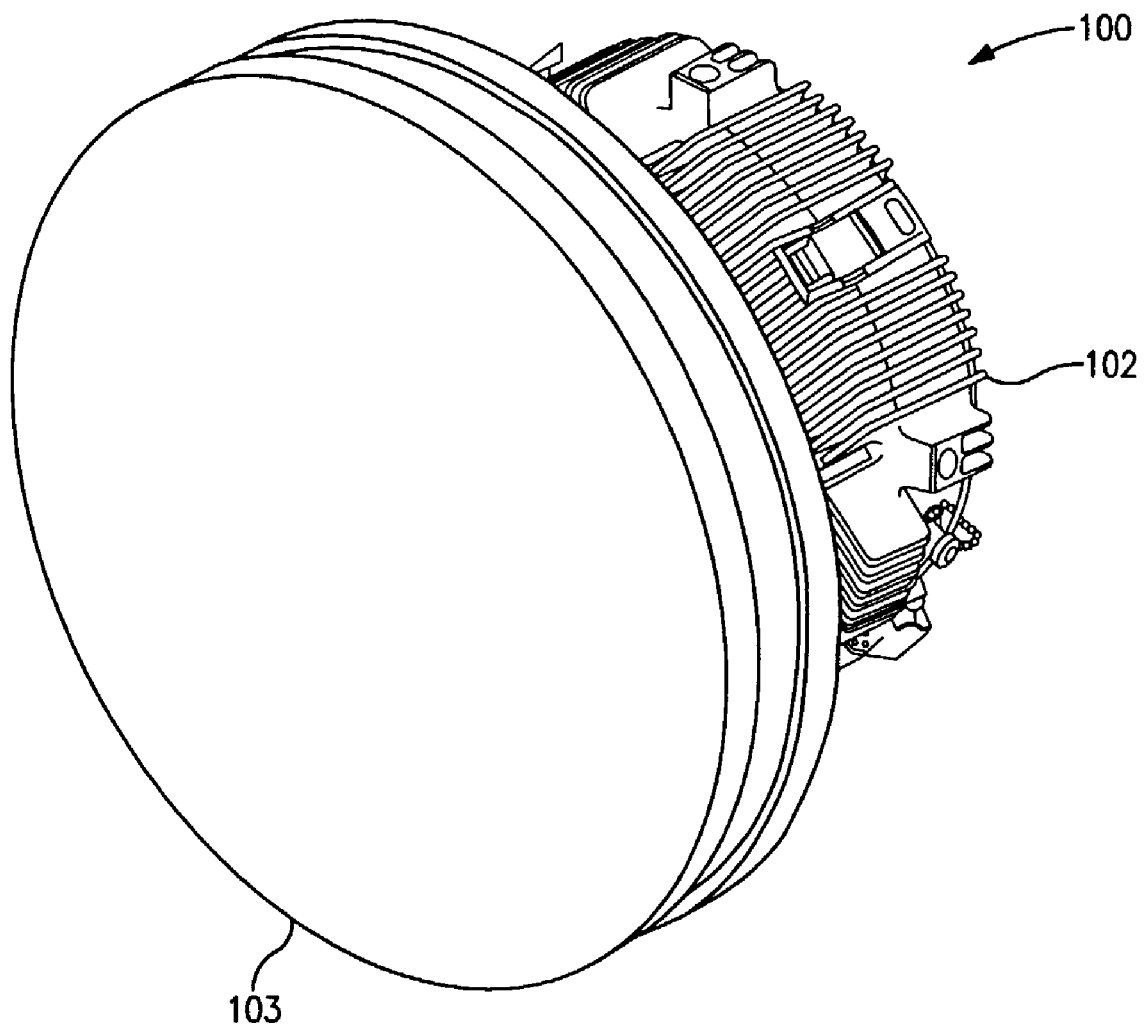
FIG. 1 is a perspective view of a transceiver assembly constructed in accordance with the present invention.

FIG. 1 is a perspective view of one embodiment of a transceiver assembly 100 constructed in accordance with the invention. The transceiver assembly includes an electronics assembly 102 and an antenna assembly 103. As noted, in general it is desirable to decrease the overall size of the electronics assembly 102 to improve the esthetics, reduce costs, and improve the ease of installation of the transceiver assembly 100.

Figure 2:
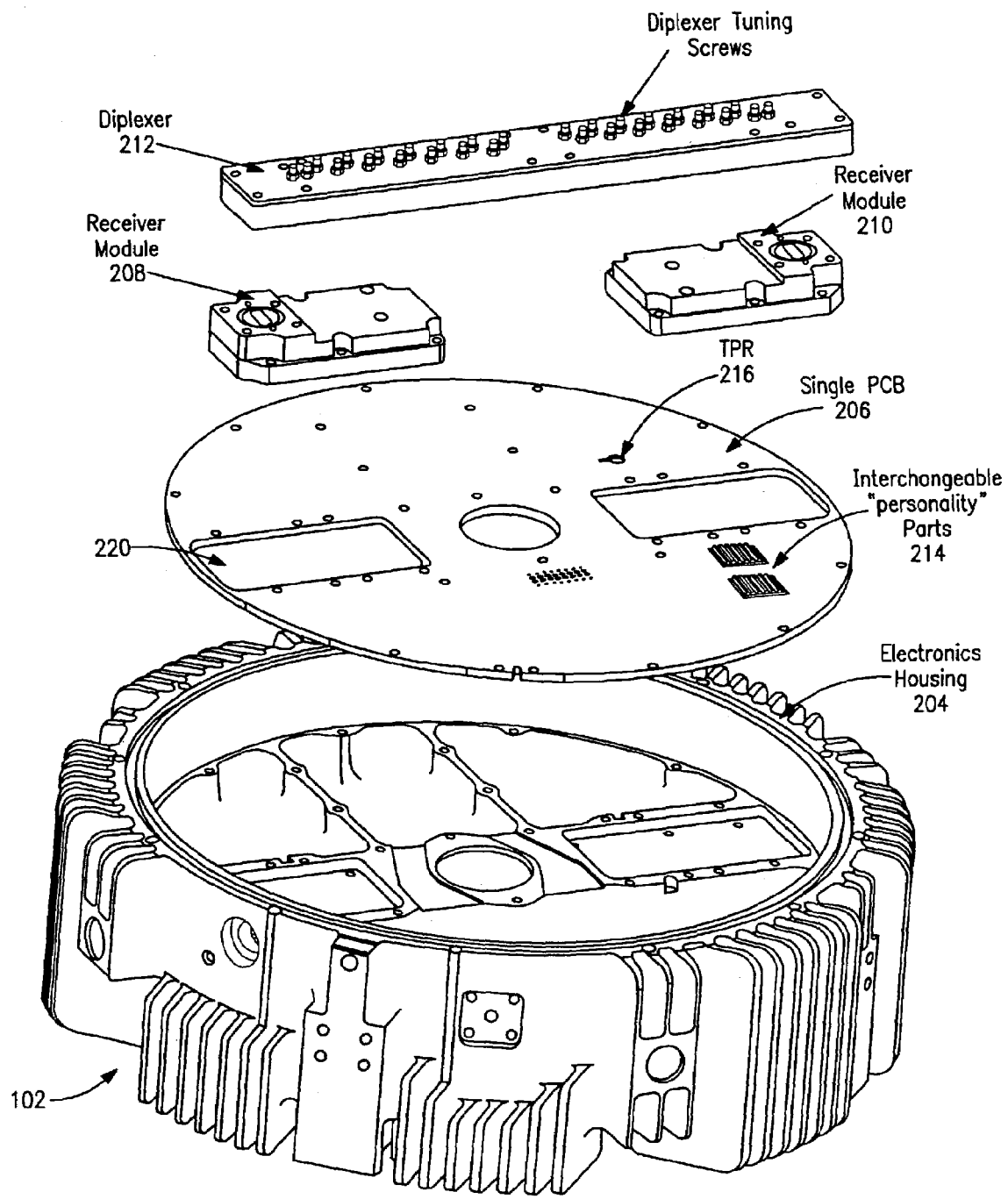
FIG. 2 is an exploded view of a transceiver assembly constructed in accordance with the invention.

FIG. 2 is an exploded view of the electronics assembly 102 shown in FIG. 1. The transceiver assembly includes an electronic housing 204, a single printed circuit board (PCB) 206, a receive module 208, a transmit module 210, and a diplexer 212. The PCB 206 includes interchangeable "personality parts" 214 that can be changed to configure the PCB to operate at different frequency bands. The PCB 206 can also include test points 216 providing, for example, accessibility to the PCB via blind-mate coaxial connectors.

Improvements in compactness and reduced cost of the transceiver assembly may be achieved from integration of electrical and Radio Frequency (RF) microwave components onto a single printed circuit board 206. The integration of the RF components onto a single PCB can include "cut-outs" 220 in the PCB allowing RF components, such as the receive module 208 and the transmit module 210 to be mounted in contact with the electronic housing as well as being connected to the PCB 206. As described below, mounting the RF components in contact with the electronic housing improves the heat dissipation of the electronic housing and connection to a single PCB reduces the number of coaxial connections in the transceiver assembly.

In many conventional complex transceiver designs, separate functions are performed on separate PCBs. Therefore, signals and data must be passed from PCB to PCB. The interface between multiple PCBs, to allow signals to pass from one PCB to another, are typically coaxial interconnects and cable assemblies. Using coaxial interconnects and cable assemblies has several drawbacks, such as increased cost, and can result in performance degradation. Performance degradation may be due, for example, to the VSWR interaction and line lengths which can cause signal ripple within the modulation bandwidth. This is particularly detrimental to higher level QAM or enhanced modulation techniques. In addition, using multiple individual PCBs is more costly than fabrication of a single PCB. These, as well as other drawbacks of using multiple PCBs, can be mitigated through the use of a single planar PCB as discussed herein.

A single PCB may have multiple configurations without changing the layout of the PCB itself. One limitation would be if different sized transmit and receive modules are used. The current tendency is to have two different module sizes to accommodate operation over a frequency range of 6 to 42 GHz. In general, one size of transmit and receive module is used for a frequency band below about 15–18 Ghz, and a different size of transmit and receive module is used for operation at frequencies above about 15–18 GHz. In accordance with the disclosed embodiment, a common PCB design and layout can accommodate multiple different frequency ranges utilizing a majority of common parts by changing only a small number of "personality parts" 214 that are mounted to the PCB and are specific to a desired frequency range and by providing an appropriately sized cut-out for the corresponding RF component. Use of such personality parts allows the same PCB layout design to be used to fabricate different PCBs for different operating frequencies. The differences between the PCBs would only be the size of the cut-out and the interchangeable personality parts specific to the desired frequency band. The personality parts can include components such as surface mount edge-coupled filters, multiplier filter cards, transceivers, and diplexers.

For example, some RF filters are fabricated by depositing an appropriate shape, and size, of traces on the surface of the PCB. Thus, changing the filter operation to a different frequency, and providing a corresponding different filter construction, requires a different PCB on which different traces are provided. By providing the filter as a personality part that is mounted on the PCB, changing the filter operation to a different frequency can be accomplished by changing the filter personality part, without changing the PCB. Another advantage to the disclosed personality parts is that they can reduce costs. For example, some filters require a low lossy substrate material for the PCB that is of increased expense. Providing different PCBs of such material for different filers can be expensive. Providing filters as a personality part, such as a high Q filter that is mounted on the PCB, permits the filter to be fabricated with a low lossy (but, more expensive) substrate material and permits the PCB to be fabricated with a higher lossy, less expensive material.

In addition, use of a single PCB can eliminate the majority of coaxial interfaces because there is no need for signals to be interfaced between multiple PCBs. Reducing the number of coaxial interfaces helps reduce amplitude and phase ripple within the modulation bandwidths. Test points can also be included on the PCB to provide accessibility to the PCB via blind-mate coaxial connectors. In addition, RF traces may be embedded within the multi-layered PCB for isolation between sensitive circuitry.

Figure 3:
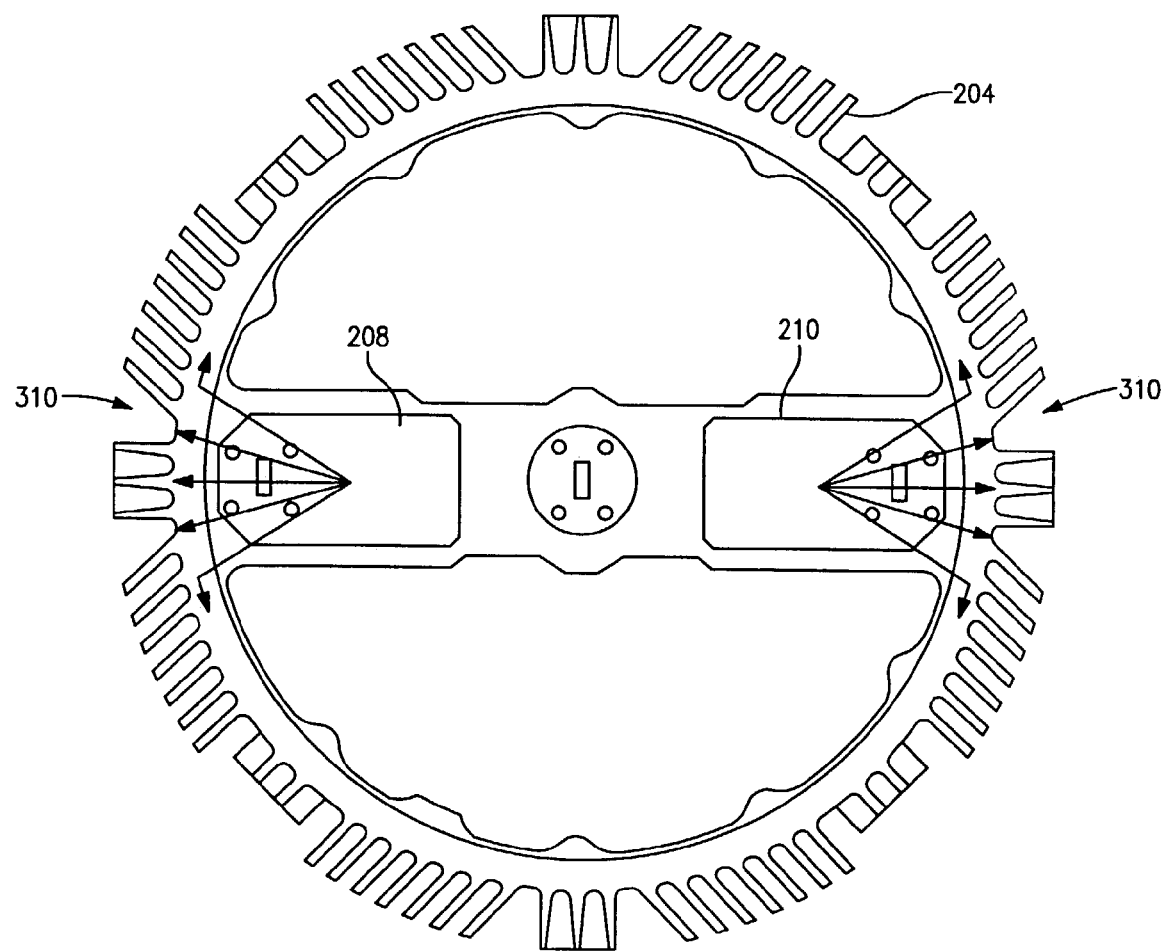
FIG. 3 is a top cross section view of a transceiver assembly constructed in accordance with the present invention illustrating a heat flow path.

While it is desirable to reduce the size of the equipment housing, or package, it is still important to dissipate heat produced by the elements, or components, within the package. FIG. 3 is a top cross section view of the circular electronic housing 204 illustrated in FIG. 2. Internal components are in thermal contact with the housing such that heat generated from the internal components, for example, a receive module 208 and a transmit module 210, flows to the electronic housing 204 along the paths illustrated by lines 310. Thus, the housing can be of relatively compact size while still efficiently dissipating heat.

Figure 4:
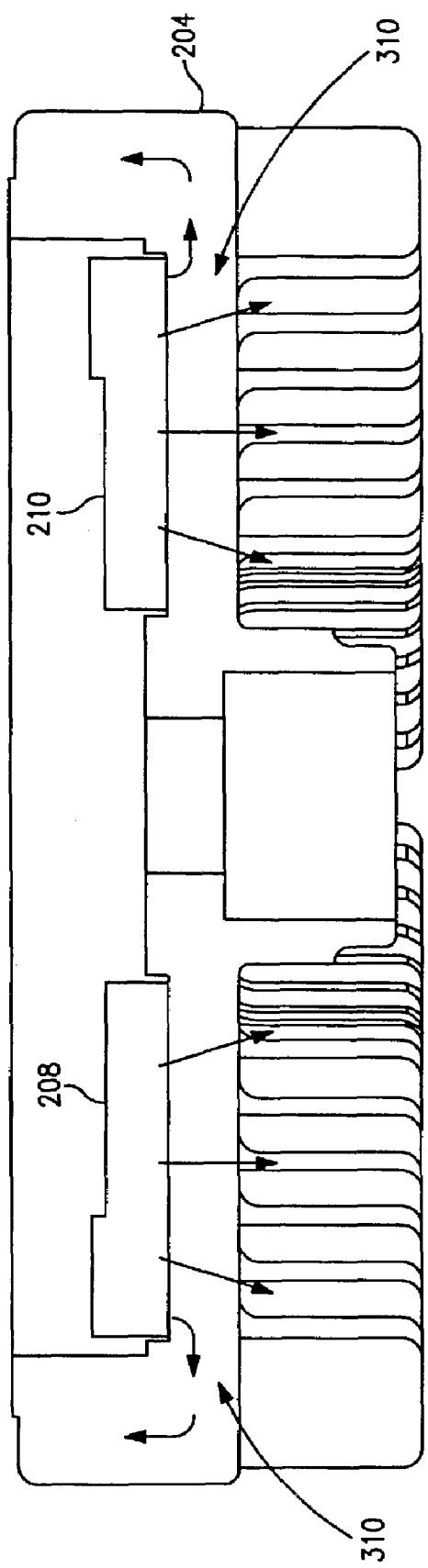
FIG. 4 is a side cross section view of a transceiver assembly constructed in accordance with the present invention illustrating a heat flow path.

FIG. 4 is a side cross section view of the circular electronic housing 204. This view illustrates additional thermal conduction that occurs in the disclosed embodiment. Heat generated from internal components, for example, a receive module 208 and a transmit module 210, flows to the electronic housing 204 along the paths illustrated by lines 310.

Figure 5:
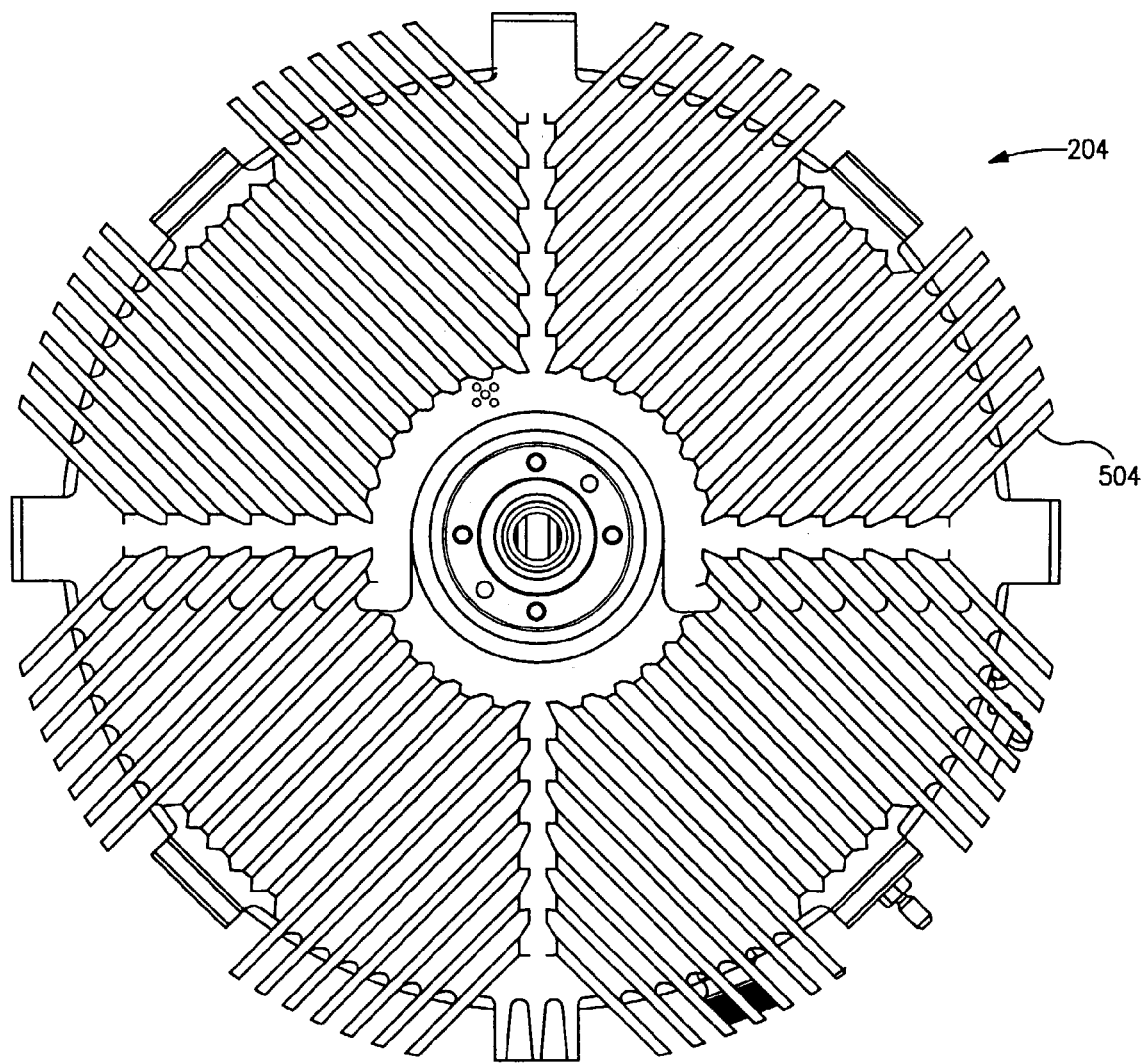
FIG. 5 is a plan of an electronic housing illustrating heat-dissipating protrusions extending outward around the circumference of the housing.

FIG. 5 is a plan view of the electronic housing 204 illustrating heat-dissipating protrusions 504 that extend outward around the circumference of the housing. The protrusions 504 provide increased surface area to increase the heat dissipating capacity of the electronic housing 204. The protrusions 504 are part of a direct contact path between heat generating modules inside the electronic housing 204 and the external environment. A direct contact path reduces the thermo-resistance between the heat generating elements and the external environment.

Figure 6:
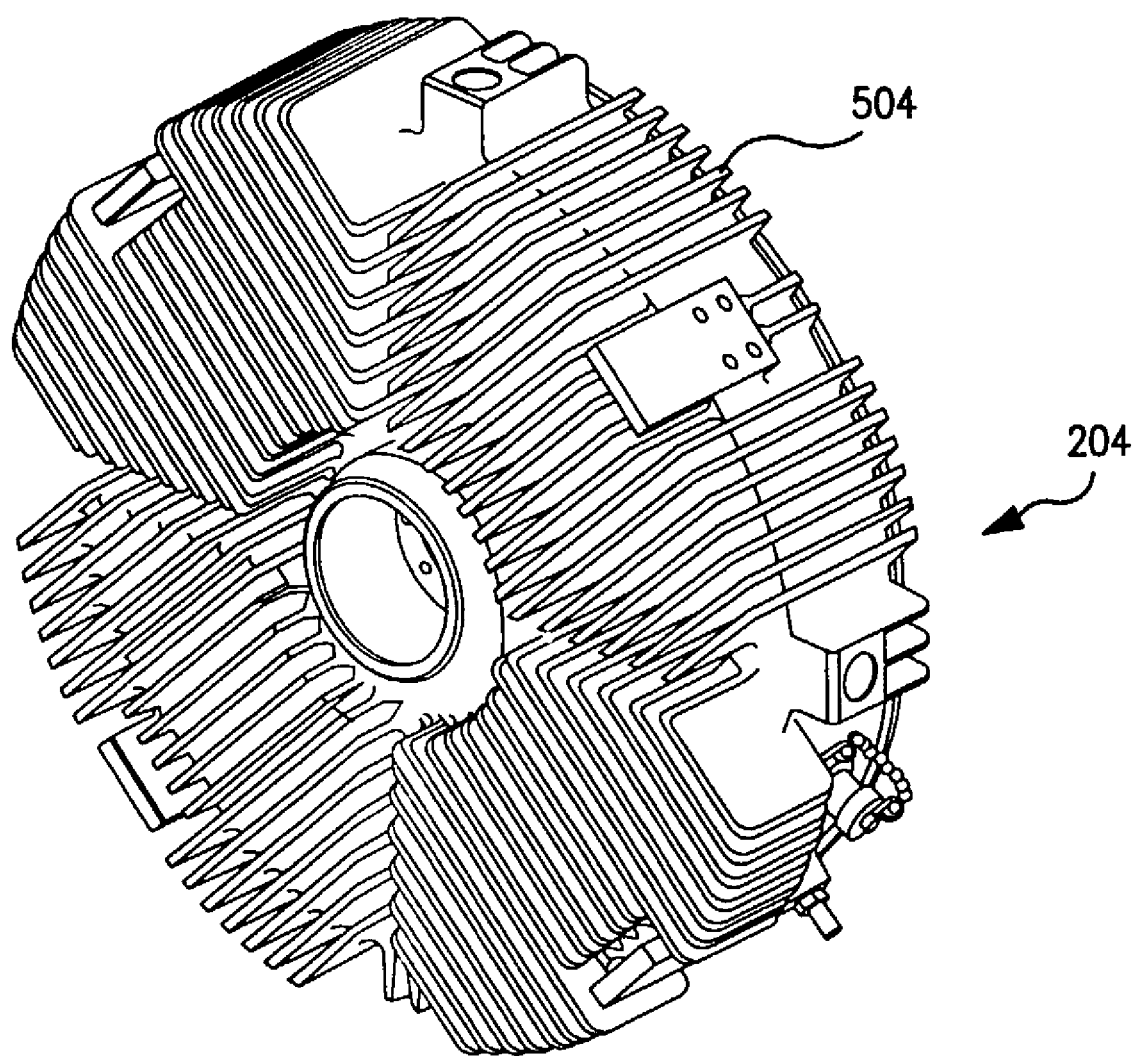
FIG. 6 is a perspective of an electronic housing illustrating heat-dissipating protrusions extending outward around the circumference of the housing.

FIG. 6 is a perspective view of the electronic housing 204 illustrating how the protrusions 504 provide a "continuous wrap-around" of the electronic housing 204 oriented at 45° to the horizon in any mounting position, extending vertically and laterally, thereby assisting in providing a convective air-flow over the protrusions 504.

Excessive thermo-resistance in the heat flow path from heat generating elements to the external environment can result in the temperature of the heat generating elements increasing to an unsatisfactory level. The increase in temperature can cause a reduction of reliability in the equipment, in particular in semiconductor devices used in the radio system. Because heat is a by-product of transistors that are used to process signals in electronic circuits, heat will be generated by the components in the equipment. If the thermo-resistance in the path from the heat generating devices to the external environment can be reduced, the performance and reliability of the system should be improved. A direct contact path, for example, the path illustrated in FIG. 1, reduces the number of mechanical interfaces that would typically be present in a conventional system, thereby improving the heat transfer between the heat generating elements and the external environment.

Figure 7:
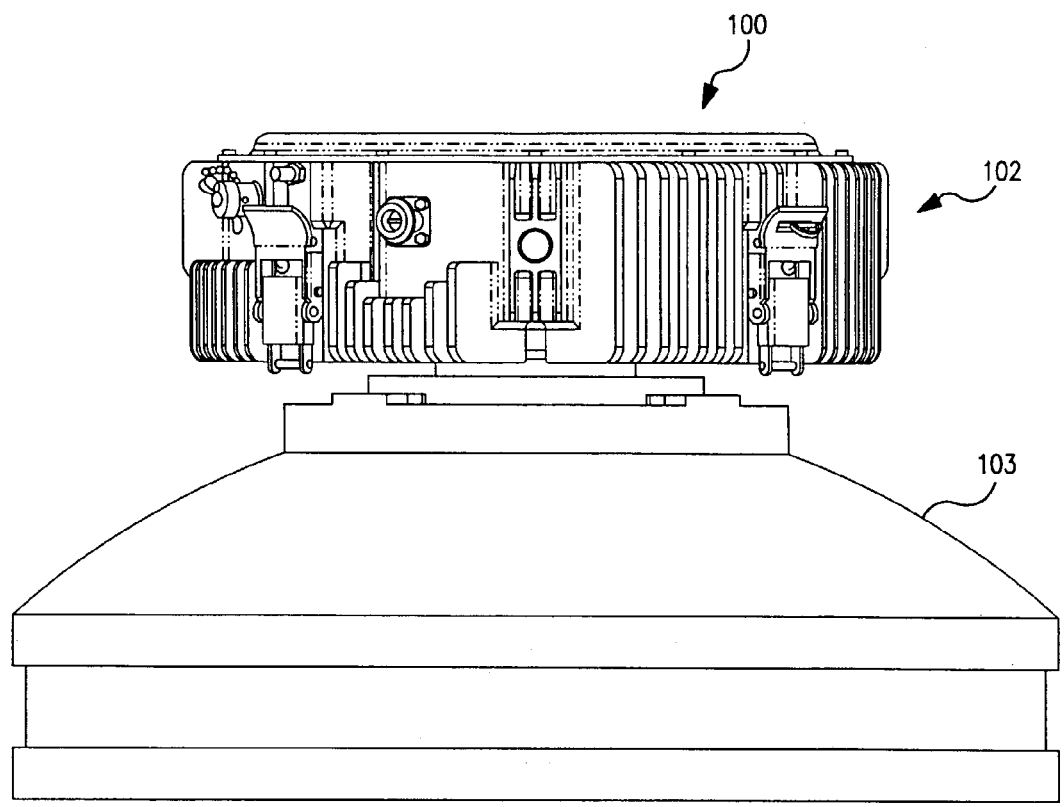
FIG. 7 is a plan view of one embodiment or a transceiver, or outdoor radio, assembly.

FIG. 7 is a plan view of one embodiment of the transceiver, or outdoor radio, assembly illustrated in FIG. 1. As shown in FIG. 7, the transceiver assembly 100 includes the electronic assembly 102 and an antenna assembly 103. Included in the electronics assembly 102 are a transmit module (transmitter), a receive module (receiver), a diplexer, and an antenna input/output transition or flange.

Figure 8:
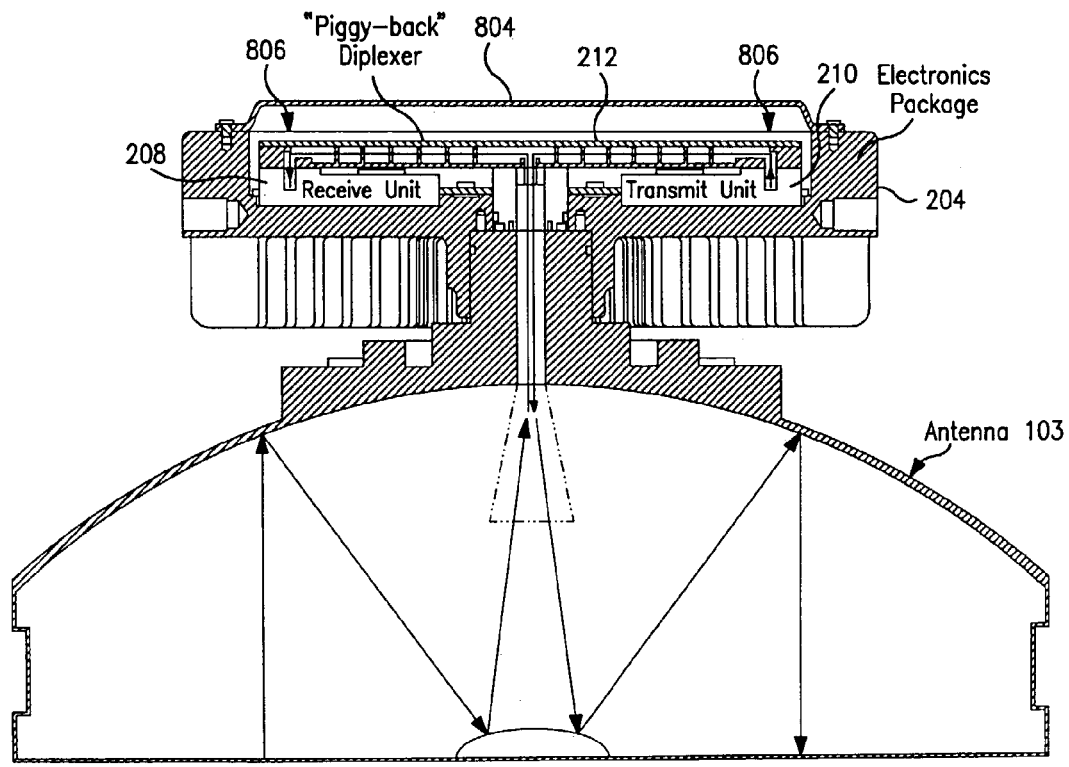
FIG. 8 is a side cross section view of the transceiver assembly of FIG. 7.

FIG. 8 is a side cross section view of the transceiver assembly of FIG. 7. As shown in FIG. 8, the transceiver assembly includes the electronic housing 204, receive module 208, transmit module 210, diplexer 212, cover 804, and antenna assembly 103. In the embodiment illustrated in FIG. 8, the receive module 208 and the transmit module 210 are placed between the antenna assembly 103 and the diplexer 212. Because the receive and transmit modules are placed on the same planar surface of the diplexer as the antenna, the RF signal path is redirected 180° from the direction in which the signal entered the diplexer, as shown by the indicated path 806.

The design feature of redirecting the RF signal path by 180° inside the electronics package provides several advantages over a conventional design where the receive and transmit modules are located above the diplexer and antenna. For example, it improves accessibility to the diplexer that determines the operating frequency of the radio thus making it possible to change the operating frequency without removing the radio from its installed position in the field. In addition, conforming to branching networks return loss requirements, if isolators are not integrated internally to the transmit and receive modules they can easily be provided atop these units interfacing the diplexer without removing the transmit and receive modules.

Figure 9:
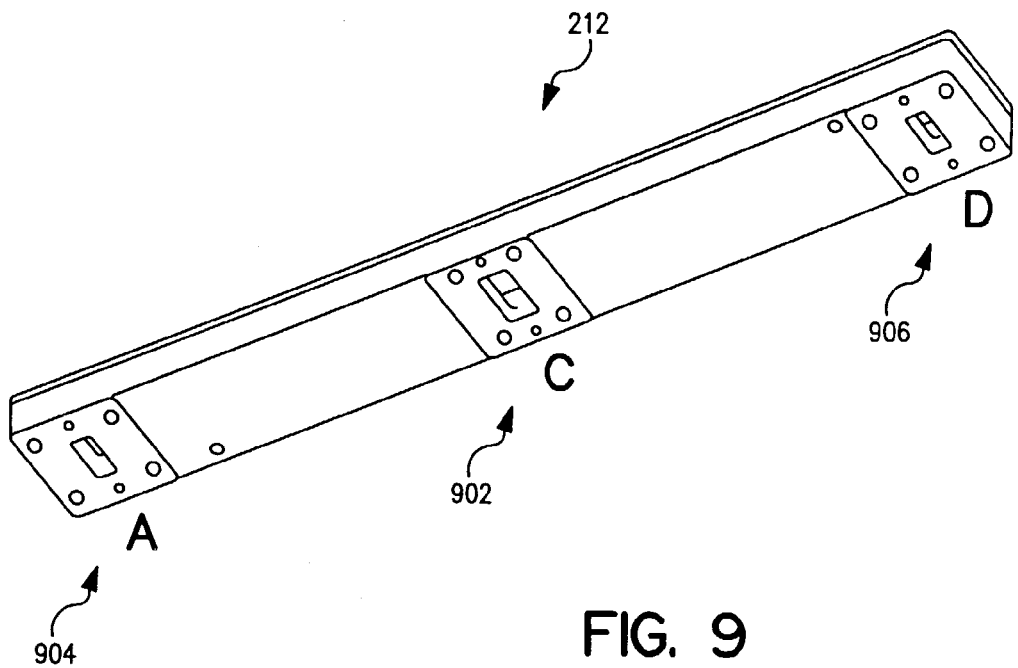
FIG. 9 is a perspective view of a diplexer illustrating three ports.

FIG. 9 is a perspective view of the diplexer 212 with three input/output connections, or ports, 902, 904, and 906 together on one side. If the frequency band of the radio system needs to be changed after installation in the network, a service technician removes the cover 804, shown in FIG. 8, from the equipment housing without removing the radio from its location, extracts the existing diplexer 212, and replaces it with a new diplexer configured for the new frequency. An advantage to this procedure is that no additional components within the equipment housing are required to be removed to gain access to the diplexer. This can be very advantageous with regard to the amount of spare equipment maintained at the factory and at the depot level.

Typically, using present factory procedures, radios are manufactured with their predetermined diplexer for a specific frequency and placed in inventory in preparation for shipment for orders received. This means that completed radios for all possible frequency bands are typically kept in inventory at the necessary inventory levels. With the ability to add diplexers without removing additional components, generic radios may be manufactured without the diplexers and placed into inventory. Then, as orders are received for specific frequency bands the generic radios are with drawn from stock, the correct diplexer and/or isolators are installed and the complete radio is delivered. The necessary level of inventory for this arrangement is reduced by the factor of the number of possible diplexers.

Similarly, the levels of inventory kept at the depot level may be reduced. For example, a network may utilize many frequencies and will normally maintain spare inventories for each frequency used in the network. By storing just a few radios without diplexers, and installing the diplexer on site as required, the level of inventory is substantially reduced.

Figure 10:
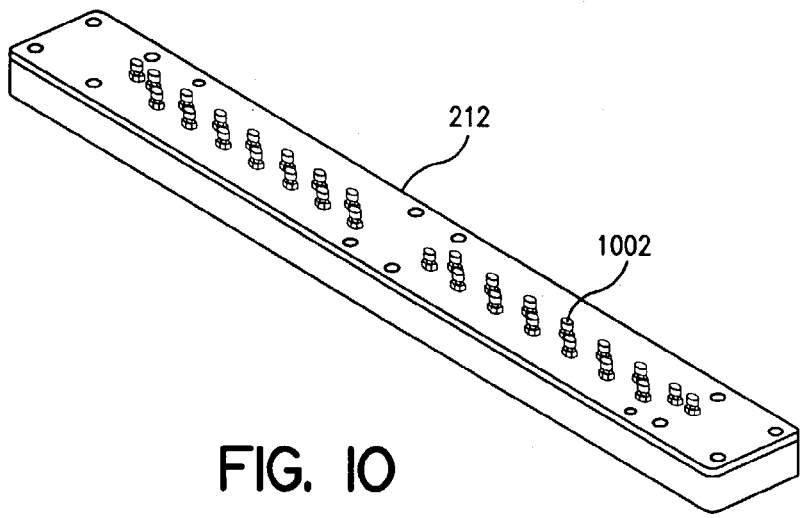
FIG. 10 is a perspective view of a diplexer illustrating tuning adjustments.

FIG. 10 is a perspective view of a diplexer 212 with tuning adjustments 1002 installed on the opposite surface of the diplexer from the input/output ports. Placement of the tuning adjustments on the diplexer surface opposite the input/output ports improves access to the tuning adjustments in the electronic housing.

Figure 11:
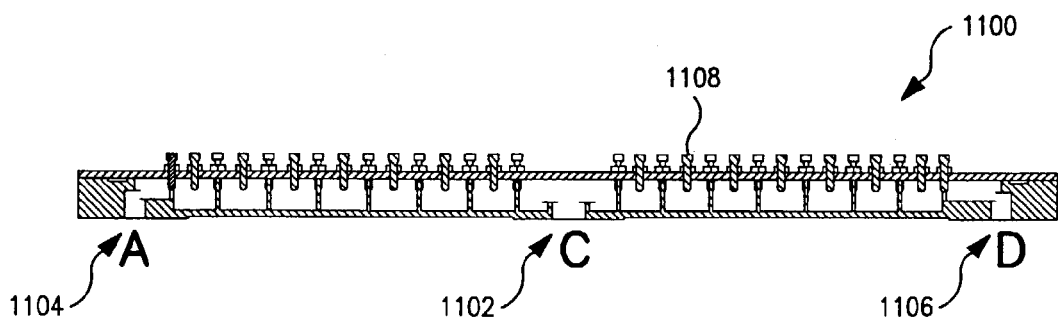
FIG. 11 is a cross section view of one embodiment of a diplexer.

FIG. 11 is a cross section view of one embodiment of a diplexer 1100. The diplexer 1100 includes three ports, 1102, 1104, and 1106 located on the same planar surface of the diplexer 1100. In addition, there are tuning adjustments 1108 located on the diplexer surface opposite the ports. The two ports 1004 and 1006 located toward the end of the diplexer 1100 are configured to redirect the RF path by 90°, and the center port 1102 is also configured to redirect the RF path an additional 90° resulting in the RF path being redirected by 180°.

Figure 12:
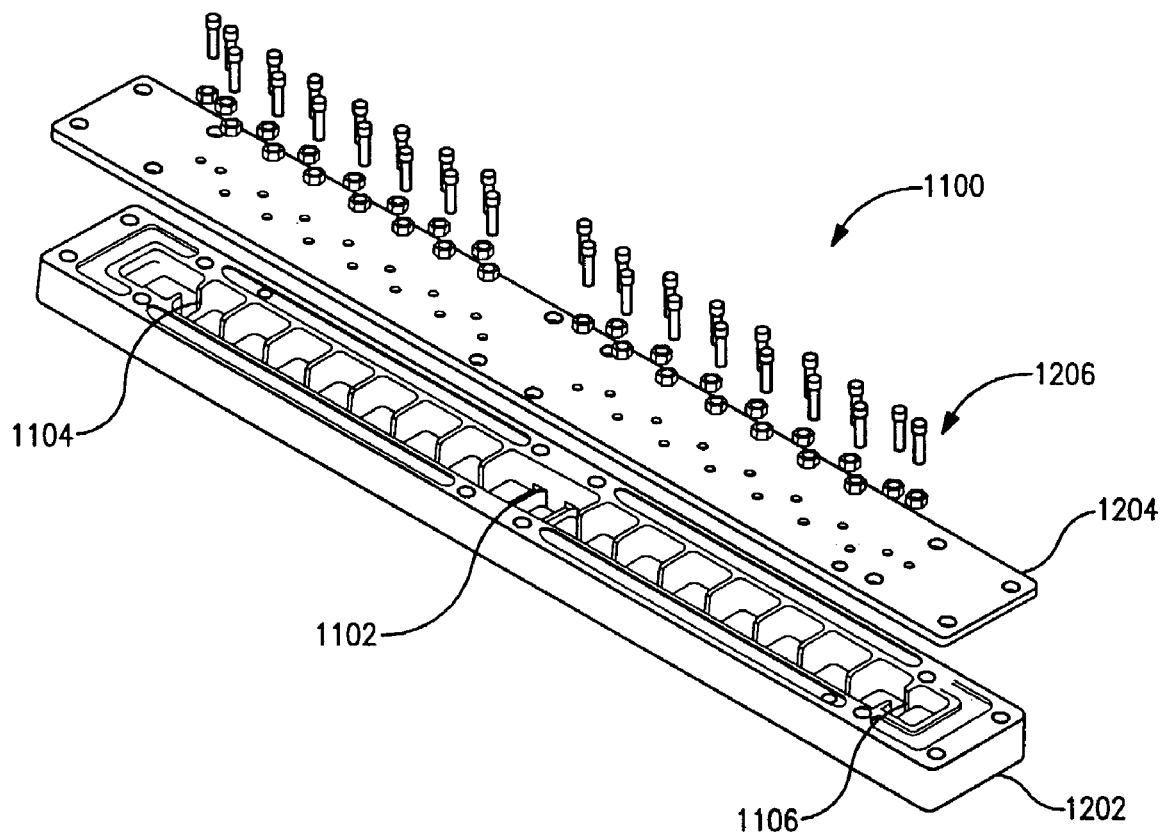
FIG. 12 is an exploded view of the diplexer illustrated in FIG. 11.

FIG. 12 is an exploded view of the embodiment of the diplexer illustrated in FIG. 11. As shown in FIG. 12, the diplexer 1100 includes a main diplexer body 1202 that is milled to a desired configuration. The diplexer body 1202 includes three ports 1102, 1104, and 1106. Attached to the diplexer body 1202 is a cover 1204 that forms a diplexer cavity for directing the RF signal. Tuning adjustments 1206 are inserted through the cover 1204.

Figure 13:
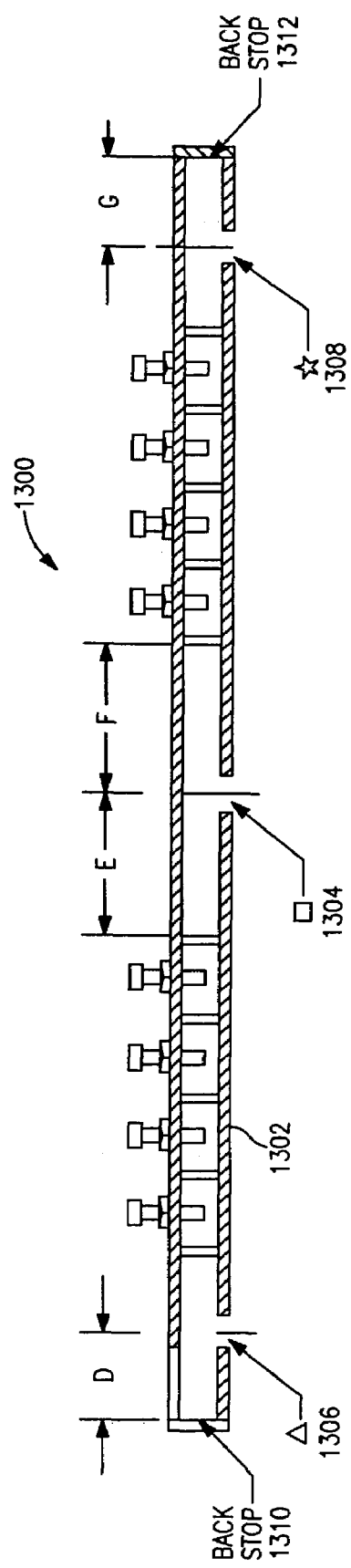
FIG. 13 is a cross section view of an alternative embodiment of a diplexer.

FIG. 13 is a side cross section view of an alternative design for the diplexer. The diplexer 1300, operating at microwave/millimeter wave frequencies, includes a waveguide 1302. The diplexer includes three ports, a first port 1304 is located toward the center of the diplexer and the second and third ports 1306 and 1308 are located towards the two ends of the diplexer. The ends of the diplexer 1300 are formed by adjustable backstops, or end-caps 1310 and 1312. As described below, the backstops 1310 and 1312 are adjusted to redirect the RF signal.

Figure 14:
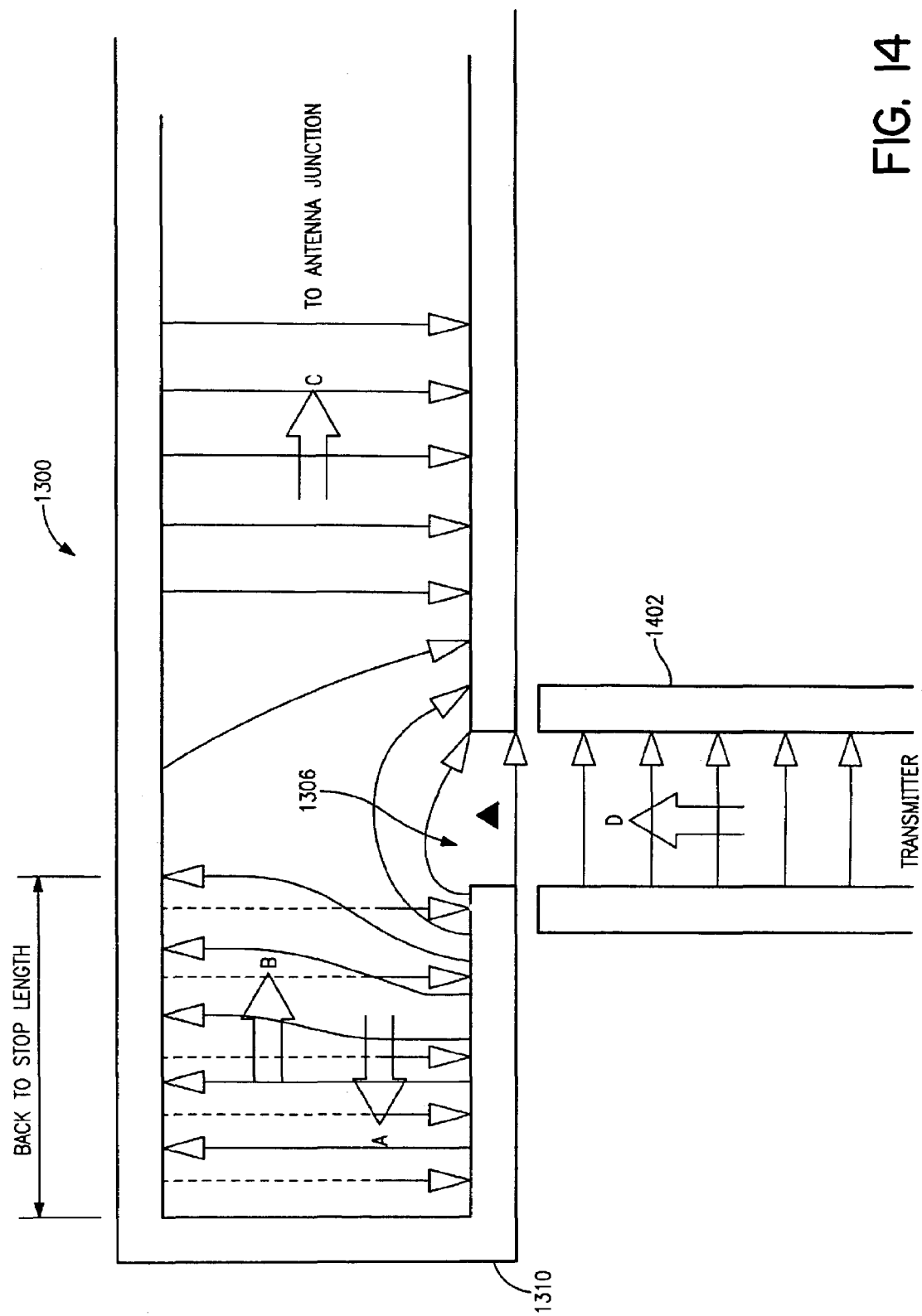
FIG. 14 is an illustration of the transmitter voltage flux as it progresses through the diplexer illustrated in FIG. 13.

Operation of the diplexer 1300 will be explained by way of an example. In this example, port 1304 is connected to an antenna, port 1306 is connected to a transmitter, and port 1308 is connected to a receiver. FIG. 14 illustrate the progress of a particular voltage flux line through the transmitter port 1306 of the diplexer 1300, rather than the field distribution at a single instant. As shown in FIG. 14, the transmitter port 1306 is mated with a wave-guide 1402 placed perpendicular to the diplexer axis used to couple the RF signal between a transmit module and the diplexer. This arrangement is commonly called an E-Plane Junction with a transmit or receive module attached to the perpendicular section of wave-guide, referred to as the side arm. The system is operating in the "TE10" mode and arrows A, B, C, and D illustrate the fields. Energy enters the diplexer from the transmitter attached to the side arm shown by the arrow marked D. At the transmitter port 1306 the power splits and travels in two paths, one path in the direction of the antenna port 1304 and the other path in the opposite direction toward a backstop 1310. Energy reaching the backstop 1310 is reflected back toward the transmitter port 1306 and is combined with the portion of signal D initially directed toward the antenna port 1304. The distance from transmitter port 1306 to the backstop 1310 is selected to cause signals to be constructively combined, creating a combined signal C toward the antenna port 1304. Performance of the diplexer 1302 may be optimized by adjusting the stub lengths and the size of the ports for the desired frequency of operation.

Figure 15:
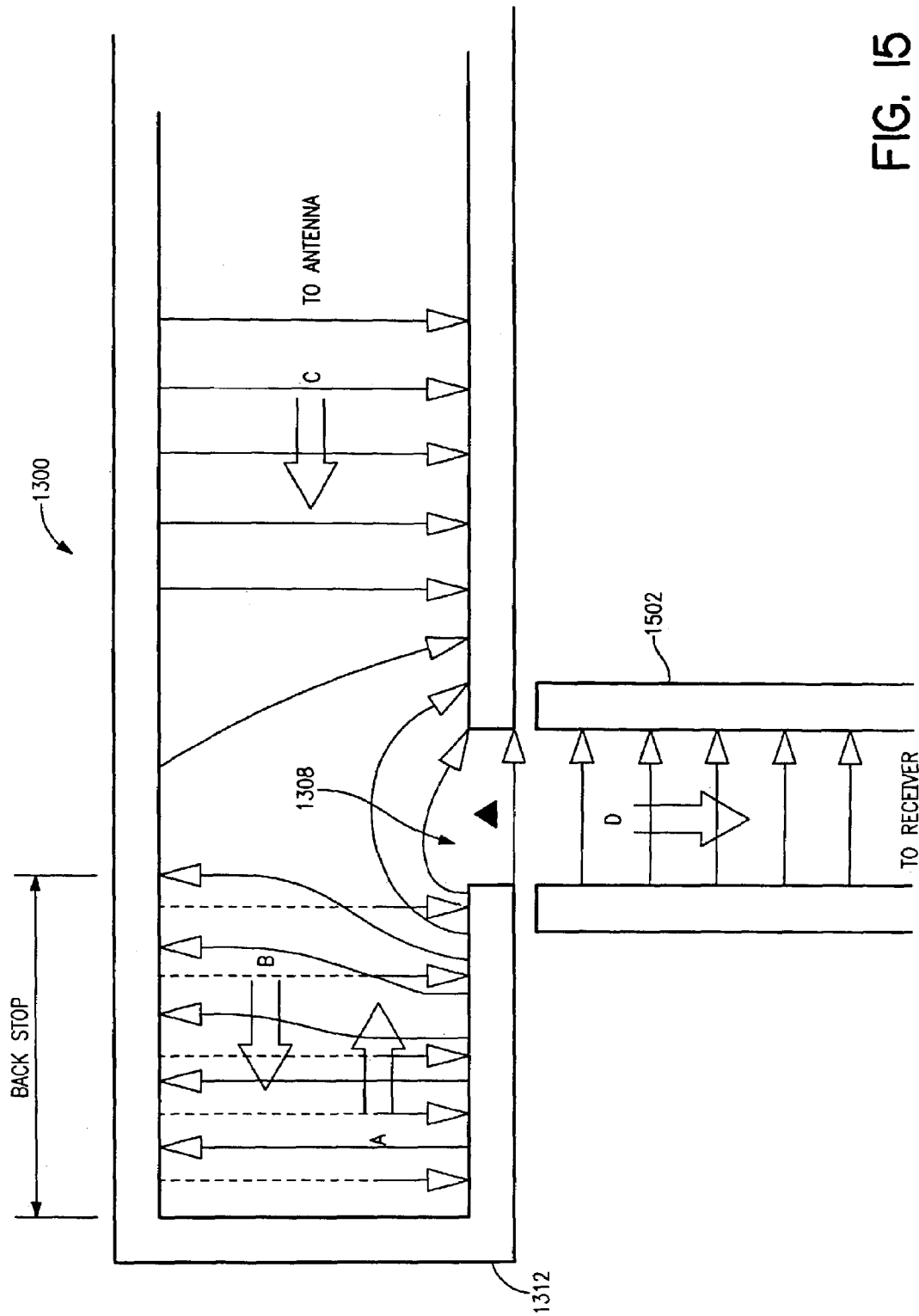
FIG. 15 is an illustration of the receiver voltage flux as it progresses through the diplexer illustrated in FIG. 13.

Operation of the receiver end of the diplexer 1300 is similar to that of the transmitter. FIG. 15 illustrates the fields and their distribution for the receiver function. Energy enters the diplexer from the antenna attached to the antenna port 1304 and travels down the diplexer as indicated by the arrow marked C. At receive port 1308 the energy splits and travels in two paths, one out the receive port 1308 and into a receiver wave-guide 1502, and the other in a direction toward a backstop 1312. Energy reaching the backstop 1312 is reflected back toward the receive port 1308 and is combined with the portion of signal C initially directed out the receiver port 1308. The distance from receiver port 1308 to the backstop 1312 is selected to cause signals to be constructively combined, creating a combined signal D out the receiver port 1308. Performance of the diplexer 1300 may be optimized by adjusting the stub lengths and the size of the ports for the desired frequency of operation.

The antenna junction 1304, also referred to as a port, operates similarly to the transmitter function except that out-of-band frequencies are removed. Removal of undesired frequencies is accomplished with frequency selective filters that create short circuits at the antenna junction and allow in band signals to progress through the filter and reject out of band frequencies by a short circuit effect.

The diplexers, as described in connection with FIGS. 11 and 13, create right-angle bends of the RF energy without the use of standard E plane wave-guide corners or smooth bends requiring several wavelengths. The standard mechanical approaches using E-Plane wave guides or smooth bends, are not as desirable as the diplexer described due to the high cost of manufacture, the difficulty in plating the internal surfaces, as well as the additional size.

Manufacturing cost of the diplexers are reduced because there are no flanges, such as the ones typically used for coupling to companion circuits such as transmitter, receiver and antenna. Also, having all the RF mating ports on one side of the diplexer, and controlling the mating tolerances/alignment, allows the diplexer to be installed into the radio system without removing other components or devices.

In addition, the diplexer illustrated in FIG. 13 is configured to have effective low-cost plating because the backstops on the diplexer can be installed after the diplexer is plated. This allows for uniform flow of the plating solution through the diplexer, which would have the effect of better quality at a lower cost. Plating can be particularly important when the diplexer is constructed with materials such as invar.

As described, one function of a diplexer as used in a radio transmitter-receiver is to allow a single antenna to be used for both the transmitter and receiver. Diplexers are employed to separate the transmitter energy from the receiver signal, directing the transmitter signal to the antenna and the receiver signal from the antenna to the receiver circuits.

Figure 16:
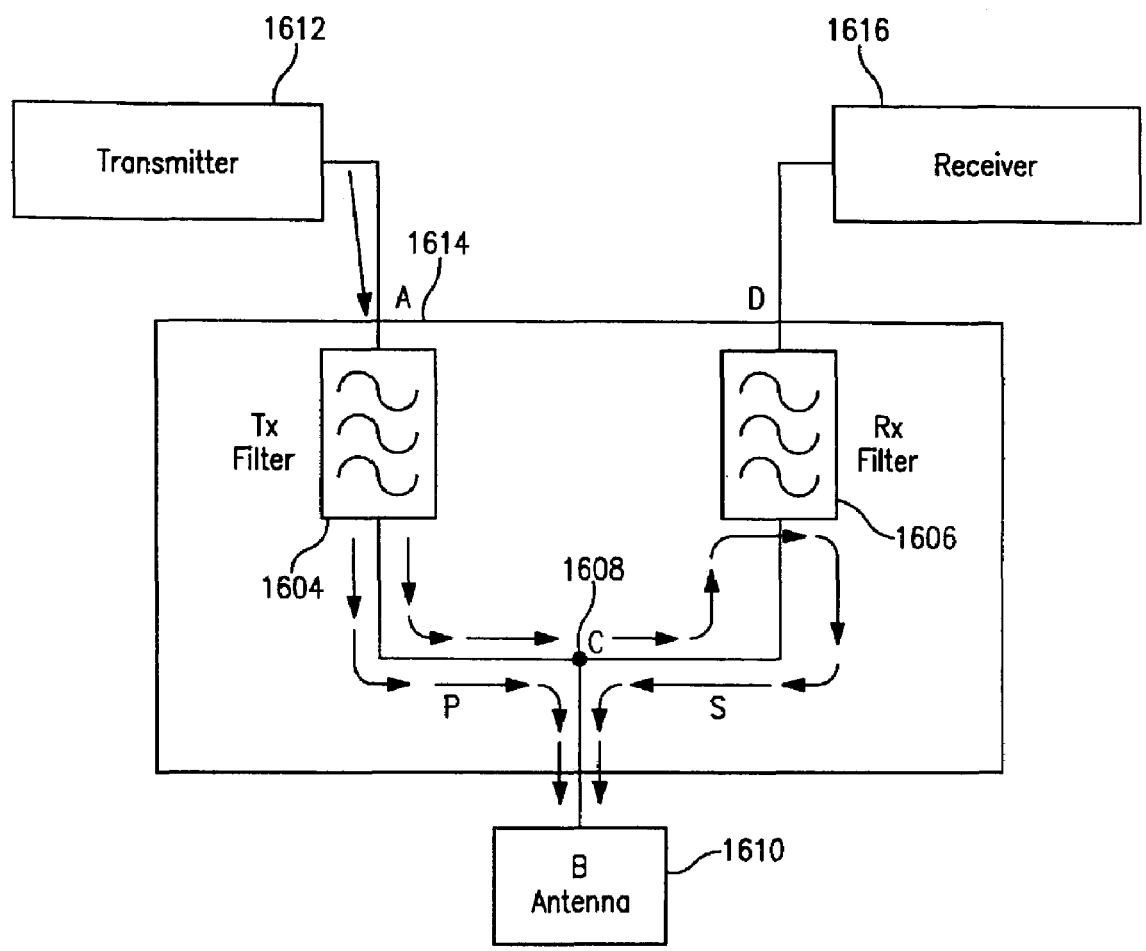
FIG. 16 is a schematic illustrating the signal flow of a transmit signal in a full duplex radio system.
Figure 17:
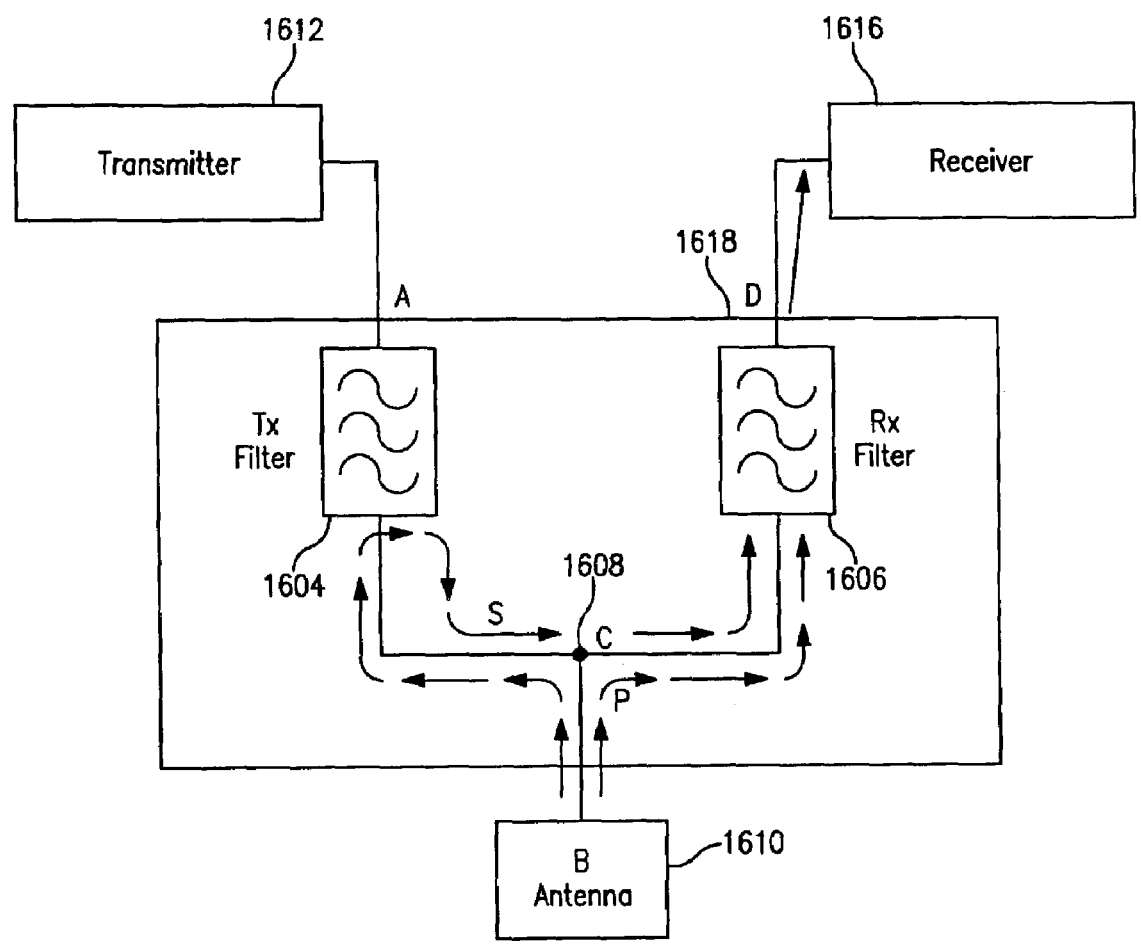
FIG. 17 is a schematic illustrating the signal flow of a receive signal in a full duplex radio system.

FIG. 16 is a schematic diagram that illustrates the signal flow of a transmit signal and FIG. 17 illustrates the flow of a receive signal in a full duplex radio system as shown in FIG. 8. In a full duplex radio system both the transmitter and receiver operate simultaneously, but at different frequencies. Signal flow through a diplexer, as illustrated in FIGS. 16 and 17, facilitates this process by including two filters, a transmitter (TX) filter 1604, and a receiver (Rx) filter 1606. There is a signal combiner 1608 that is coupled to a single, common, antenna 1610. Power from a transmitter 1612 is attached to an input port, or transition, 1614 of the diplexer and passes through the transmitter filter 1604 to the combiner 1608. The transmitter signal is inhibited from entering a receiver 1616 by the receiver filter 1606, which is tuned to the receiver signal frequency and therefore rejects the transmitter frequency. Transmitter signals, combined at combiner point 1608 are next directed to the antenna 1610.

FIG. 17 illustrates the flow of signals received by the radio system. Shown in FIG. 17, receiver signals, picked up by the antenna 1610, are directed to the combiner point 1608. This signal has two paths from the combiner point 1608, one path to the transmitter filter 1604 and another to the receiver filter 1606. Receiver signals are rejected by the transmitter filter 1604 and redirected back through the combiner point 1608 where they combine with the primary signal and travel to the receiver filter 1606. The combined signals exit the diplexer at receiver port 1618 to be applied to the receiver circuits 1616.

Figure 18:
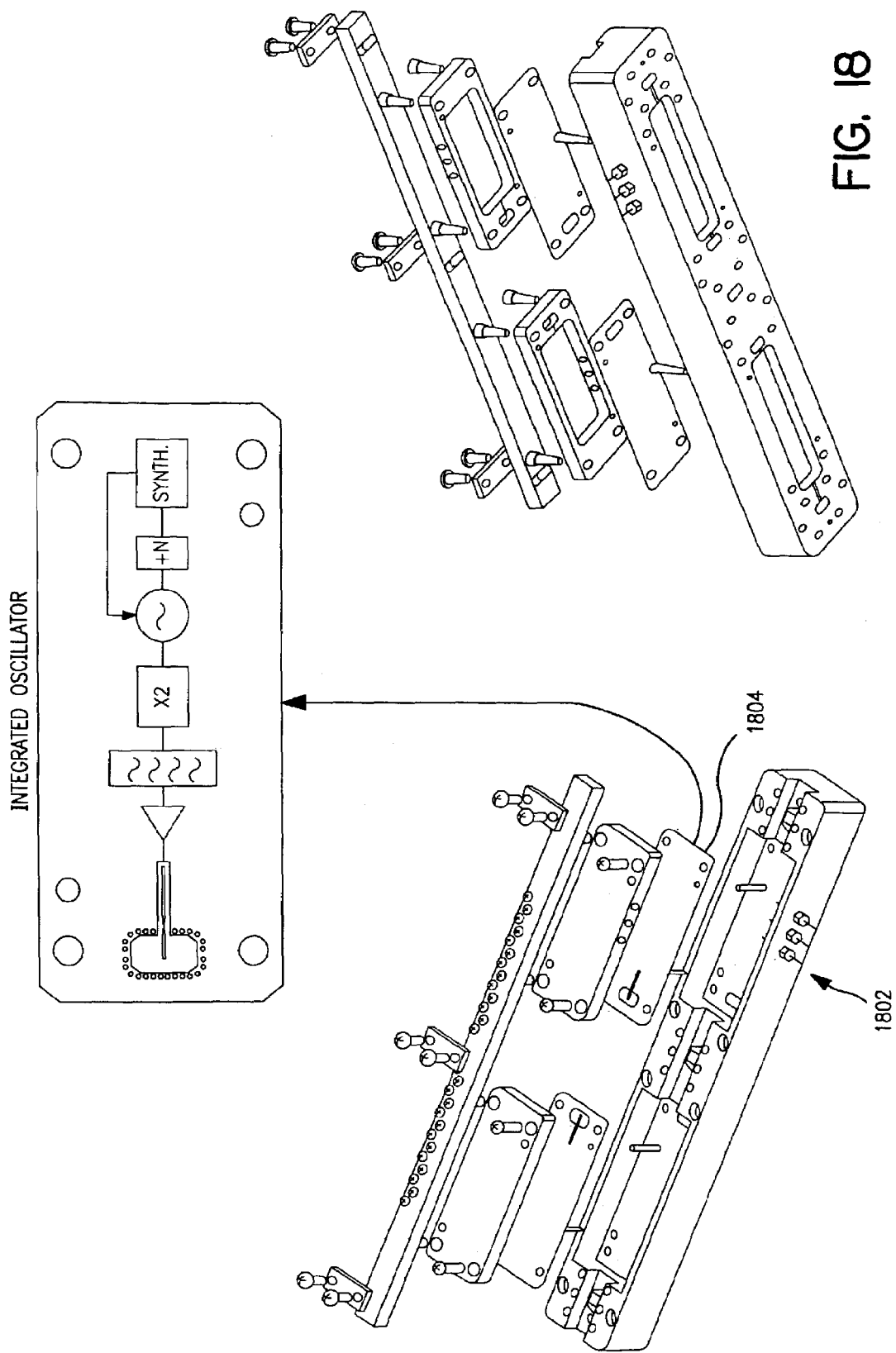
FIG. 18 is a perspective view of another embodiment of a diplexer.

Another embodiment of the diplexer is illustrated, in an exploded view, in FIG. 18. In this embodiment the diplexer 1802 includes an oscillator 1804 that generates reference signals used for the transmitter and receiver included in the diplexer 1802.

In general, there are at least two circuits that determine the operating frequency of the radio system. As discussed, the diplexer including transmit and receive filters is one of the circuits. Another circuit is the oscillator that generates the reference signals used by the transmitter and receiver. Typically, the oscillator is required to tune over the entire possible operating range of the radio, and the diplexer is installed to limit tuning range to only sub-bands of the frequency range.

Oscillators, which have the ability to tune over the entire operating range of the radio, are typically expensive. In addition, the oscillators are usually installed as a separate circuit within the radio system. Generally, the oscillator is a permanent part of the radio and not exchanged when a new sub-band of frequencies of operation is desired. Typically, when a new sub-band frequency is desired the oscillator is not replaced, but is electronically tuned to the new desired frequency. This is different than the diplexer, in that when the diplexer is replaced a new diplexer that has been pre-tuned to the new frequency and sub-band is installed.

Combining the diplexer and oscillator provides several advantages. For example, combining the oscillator and diplexer reduces the need for the oscillator to tune over the entire operating range of the radio. The electronic tuning of the oscillator can be limited to the range of the sub-band frequencies defined by the diplexer. When a new frequency of operation is desired, a diplexer and oscillator combination that has been pre-tuned to the desired frequencies is installed. Reducing the frequency range that the oscillator is needed to tune over enhances the radio system performance as well as allowing less expensive oscillators to be used resulting in significant cost reduction. Typically, the only changes regarding the synthesizers are varactor diodes and resonator circuits. The balance of the circuit remains untouched.

Figure 19:
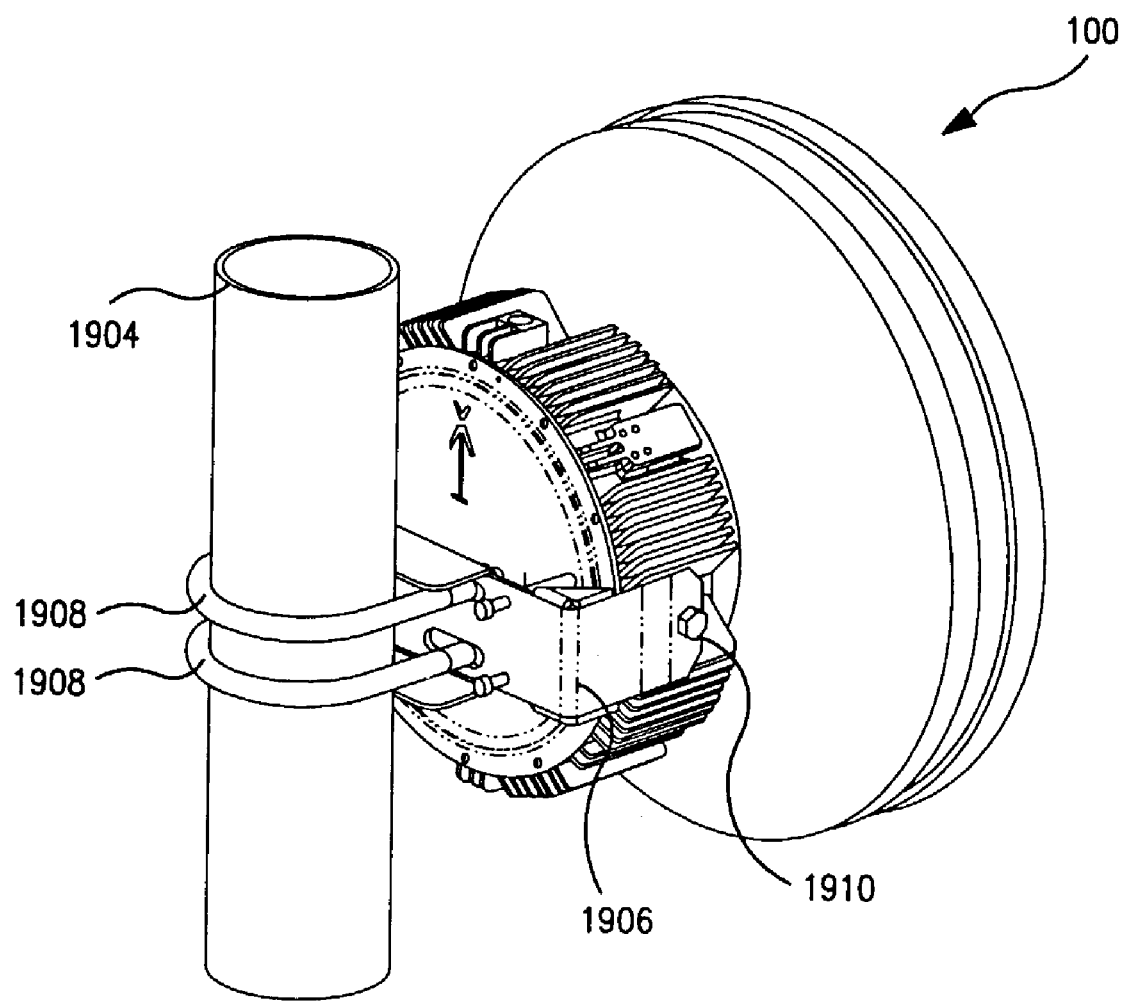
FIG. 19 is a perspective view of an example of a transceiver assembly mounting system.
Figure 20:
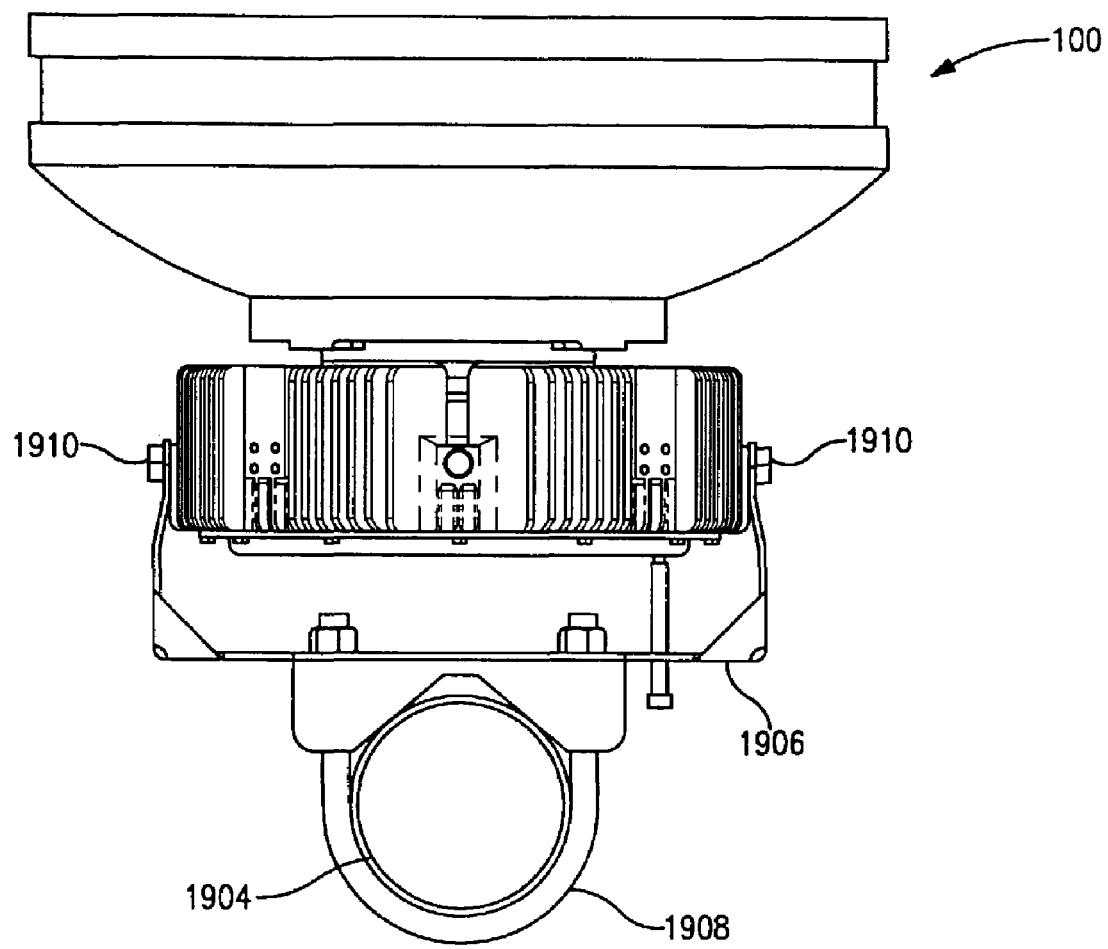
FIG. 20 is a top view of an example of a transceiver assembly mounting system.

An additional aspect of the transceiver assembly 100 is an installation mounting system. In one embodiment, the installation mounting system is integral to the electronics housing, which allows for simple adjustments in both elevation and azimuth. Once adjusted and locked in place, the antenna and electronics assembly can be removed as a single unit and replaced with a like unit without having to do any re-adjustment. An example of such a mount is shown in FIGS. 19 and 20. FIG. 19 is a perspective of one example of a mounting system and FIG. 20 is a top view of the same mounting system. In the example illustrated in FIGS. 19 and 20 the transceiver assembly 100 is mounted on a pole 1904 by mounting system 1906. Clamps 1908 allow the transceiver assembly 100 to be radially adjusted for a desired azimuth. Adjustments 1910 allows the transceiver assembly 100 to pivot and thereby adjust the elevation of a signal radiated from the transceiver assembly 100. In other embodiments the mounting system can be adapted to be mounted in other locations, for example, on the corner of a building, or the top of a wall, or the surface of a wall.

The foregoing description details certain embodiments of the invention. It will be appreciated, however, that no matter how detailed the foregoing appears, the invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes, which come with the meaning and range of equivalency of the claims, are to be embraced within their scope.

We claim:

1. A transceiver assembly comprising:
    a single printed circuit board;
    an antenna input/output transition;
    a transmit module;
    a receive module; and
    a diplexer having opposed planar surfaces, wherein the transmit module, receive module, and antenna input/output transition are located on the same planar surface of the diplexer;
    wherein the circuit board includes personality parts used to configure the transceiver assembly; and
    wherein a first base material is used in the fabrication of the printed circuit board and a second base material is used in the fabrication of the personality parts.

2. A method of constructing a radio system, the method comprising:
    attaching electronic components to a printed circuit board surface established by a plane of an antenna input/output transition;
    providing relief in the printed circuit board such that the antenna input/output transition extends through the printed circuit board; and
    coupling a first port of a diplexer having three ports located on the same planar surface to the antenna input/output transition;
    wherein attaching electronic components to the printed circuit board includes attaching personality parts to the circuit board; and
    wherein the printed circuit board is fabricated with a first base material and the personality parts are fabricated with a second base material.

* * * * *